United States Patent
Fukushima et al.

(10) Patent No.: US 8,900,772 B2
(45) Date of Patent: Dec. 2, 2014

(54) FUEL CARTRIDGE, FUEL CELL, AND POWER GENERATION METHOD

(75) Inventors: Kazuaki Fukushima, Kanagawa (JP); Yoshiaki Inoue, Aichi (JP); Yuto Takagi, Kanagawa (JP); Atsushi Sato, Kanagawa (JP); Jusuke Shimura, Kanagawa (JP)

(73) Assignee: Sony Corporation (JP)

( * ) Notice: Subject to any disclaimer, the term of this patent is extended or adjusted under 35 U.S.C. 154(b) by 712 days.

(21) Appl. No.: 12/746,026

(22) PCT Filed: Dec. 11, 2008

(86) PCT No.: PCT/JP2008/072492
§ 371 (c)(1),
(2), (4) Date: Jun. 3, 2010

(87) PCT Pub. No.: WO2009/075319
PCT Pub. Date: Jun. 18, 2009

(65) Prior Publication Data
US 2010/0261076 A1     Oct. 14, 2010

(30) Foreign Application Priority Data
Dec. 13, 2007   (JP) ................ 2007-322503

(51) Int. Cl.
*H01M 8/24* (2006.01)
*H01M 8/04* (2006.01)

(52) U.S. Cl.
CPC ...... *H01M 8/04365* (2013.01); *H01M 8/04208* (2013.01); *Y02E 60/50* (2013.01); *H01M 8/04753* (2013.01); *H01M 8/04664* (2013.01); *H01M 8/04746* (2013.01)
USPC ............ 429/462; 429/443; 429/444; 429/428

(58) Field of Classification Search
CPC .......... H01M 8/04365; H01M 8/0428; H01M 8/04753; H01M 8/04664; H01M 8/04746
USPC .................. 429/462, 443, 444, 428
See application file for complete search history.

(56) References Cited

U.S. PATENT DOCUMENTS

| | | | |
|---|---|---|---|
| 2004/0001987 A1 | 1/2004 | Kinkelaar et al. | |
| 2005/0147854 A1 | 7/2005 | Sone et al. | |
| 2007/0281189 A1* | 12/2007 | Watanabe et al. | 429/14 |
| 2008/0220302 A1* | 9/2008 | Yamamoto et al. | 429/24 |

FOREIGN PATENT DOCUMENTS

| | | | |
|---|---|---|---|
| JP | 2005-030699 | 2/2005 | |
| JP | 2005-197065 | 7/2005 | |
| JP | 2005-531901 | 10/2005 | |
| JP | 2006-164872 | * 6/2006 | ............ H01M 8/04 |
| JP | 2007-123293 | 5/2007 | |
| WO | 2004/004045 A2 | 1/2004 | |

* cited by examiner

*Primary Examiner* — Helen O Conley
(74) *Attorney, Agent, or Firm* — Sheridan Ross P.C.

(57) ABSTRACT

A fuel cartridge with which liquid leakage through an air induction hole from a fuel tank is able to be prevented and safety is able to be improved is provided. Switching drive for opening and closing an air induction hole 12 is performed by a valve 13 capable of controlling the switching drive according to a control signal. Thereby, air introduction to a fuel tank 100 containing a fuel is able to be controlled. Thus, for example, at the time of high temperature or fuel disorder, by closing the air induction hole 12 by the valve 13, fuel leakage from the fuel tank through the air induction hole of an existing check valve is able to be prevented, and safety is able to be improved.

10 Claims, 9 Drawing Sheets

FUEL CARTRIDGE, FUEL CELL, AND POWER GENERATION METHOD

CROSS REFERENCE TO RELATED APPLICATIONS

The present application is a national stage of International Application No. PCT/JP2008/072492 filed on Dec. 11, 2008 and claims priority to Japanese Patent Application No. 2007-322503 filed on Dec. 13, 2007 the disclosures of which are incorporated herein by reference.

BACKGROUND

The present invention relates to a fuel cartridge for storing a fuel cell-use fuel, a fuel cell including the same, and a power generation method applied to such a fuel cell.

A fuel cell has a structure in which an electrolyte is arranged between an anode electrode (fuel electrode) and a cathode electrode (oxygen electrode). A fuel is supplied to the anode electrode, and an oxidant is supplied to the cathode electrode, respectively. At this time, redox reaction in which the fuel is oxidized by the oxidant is initiated, and chemical energy contained in the fuel is converted to electric energy.

Such a fuel cell is able to continuously generate power by continuously supplying the fuel and the oxidant. Thus, the fuel cell is expected as a new power source for a mobile electronic device different from the existing primary battery or the existing secondary battery. That is, since the fuel cell generates power by using chemical reaction between the fuel and the oxidant, if oxygen in the air is used as the oxidant and the fuel is continuously resupplied from outside, the fuel cell is able to be continuously used as a power source unless the fuel cell goes out of order. Thus, a downsized fuel cell is able to become a high energy density power source that is suitable for a mobile electronic device without necessity of charging.

To resupply the fuel to the fuel cell, an exchangeable fuel cartridge having a fuel tank for containing the fuel is desirably used. As the fuel contained in such a fuel cartridge, different types of fuels containing various components may be used in addition to methanol.

In general, the fuel cartridge is provided with an air induction hole through which air for a portion of a cubic volume of exhausted fuel is taken in (for example, Patent Document 1). The air induction hole is provided for the purpose of introducing gas for the portion of the cubic volume of exhausted fuel liquid and obtaining a constant inner pressure. If such an air induction hole does not exist, the inner pressure of the cartridge becomes a negative pressure, and thus the fuel is not able to be exhausted by a pump, or the fuel is flown back. Accordingly, the fuel is not able to be stably supplied.

Patent Document 1: Japanese Unexamined Patent Application Publication No. 2005-531901

SUMMARY

Therefore, if a check valve is provided for the air induction hole, it is possible that fuel leakage is able to be prevented, and air is able to be taken by opening the valve under the condition of a certain negative pressure.

However, the check valve openable under a low pressure (mushroom valve: using elastic force of a rubber material; ball valve: using spring pressure and the like) shows favorable non-return characteristics when the pressure is high, and has a disadvantage that the non-return characteristics are lowered under the condition that the pressure is close to a normal pressure. The lowered non-return characteristics causes liquid leakage through the air induction hole (liquid leakage from a fuel tank), leading to safety problem.

In view of the foregoing problem, it is an object of the present invention to provide a fuel cartridge with which liquid leakage through an air induction hole from a fuel tank is able to be prevented and safety is able to be improved, a fuel cell, and a power generation method.

A fuel cartridge of the present invention includes a package having an air induction hole and containing a fuel for a fuel cell body, and a valve performing switching drive for opening and closing the air induction hole. The valve is able to control the switching drive according to a control signal.

A fuel cell of the present invention includes a fuel cell body generating power by being supplied with a fuel and air as oxidant gas, and a fuel tank containing the fuel for the fuel cell body. The above-mentioned fuel tank has an air induction hole and is provided with a valve performing switching drive for opening and closing the air induction hole. The valve is able to control the switching drive according to a control signal.

In a power generation method of the present invention, at the time of performing power generation by supplying a fuel contained in a fuel tank and air as oxidant gas to a fuel cell body, air is introduced to the fuel tank through an air induction hole, and switching drive for opening and closing the air induction hole is performed by a valve capable of controlling the switching drive according to a control signal.

In the fuel cartridge, the fuel cell, and the power generation method of the present invention, switching drive for opening and closing the air induction hole is performed by the valve capable of controlling the switching drive according to the control signal. Thereby, controlling air introduction to the package or the fuel tank containing the fuel is enabled.

According to the fuel cartridge, the fuel cell, or the power generation method of the present invention, switching drive for opening and closing the air induction hole is performed by the valve capable of controlling the switching drive according to the control signal. Thereby, controlling air introduction to the package or the fuel tank containing the fuel is enabled. Accordingly, fuel leakage from the fuel tank through the air induction hole of an existing check valve is able to be prevented, and safety is able to be improved.

Additional features and advantages of the present invention are described in, and will be apparent from, the following Detailed Description and the Figures.

DETAILED DESCRIPTION

An embodiment of the present invention will be hereinafter described in detail.

Figure 1:
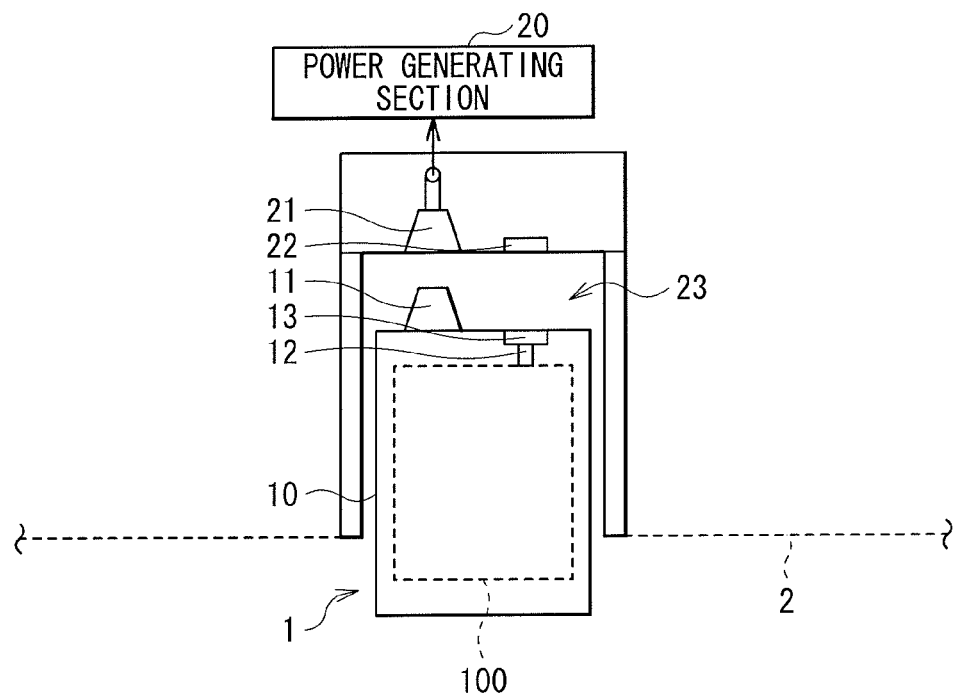
FIG. 1 is a cross sectional view illustrating a substantial part structure of a fuel cell including a fuel cartridge according to an embodiment of the present invention.
Figure 2:
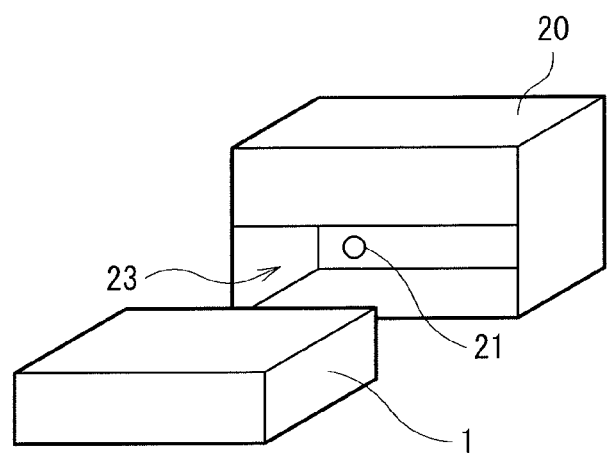
FIG. 2 is a perspective view illustrating the substantial part structure of the fuel cartridge and the fuel cell body illustrated in FIG. 1.

FIG. 1 illustrates a cross sectional structure of a substantial part of a fuel cell including a fuel cartridge (fuel cartridge 1) according to an embodiment of the present invention. Further, FIG. 2 is a perspective view of the substantial part structure of the fuel cell. The fuel cell includes a fuel cell body 2 and the fuel cartridge 1 that is connected by being loaded into a groove 23 of the fuel cell body 2.

The fuel cartridge 1 is a changeable fuel cartridge used for a fuel cell loaded as a power source for a mobile electronic device such as a mobile phone and a notebook PC (Personal Computer). For example, the fuel cartridge 1 has a fuel tank 100 containing methanol or the like as a fuel inside a package 10 having a flat rectangular solid shape. Further, a fuel supply connector 11 for delivering the fuel from the fuel tank 100 and an air induction hole 12 for introducing air into the fuel tank 100 are provided on the top face (face on the groove 23 side) of the package 10. Further, a valve 13 for performing switching drive for opening and closing the air induction hole 12 is provided on outside of the air induction hole 12 (upper portion on the groove 23 side).

The fuel supply connector 11 is a connector structured so that the inner valve (not illustrated) is opened in the case where the fuel cartridge 1 is connected to the fuel cell body 2. The fuel is supplied to a power generation section 20 through the fuel supply connector 11 and a fuel supply connector 21 on the fuel cell body 2 side described later.

The air induction hole 12 is a hole to introduce air for a portion of a cubic volume of a fuel exhausted from the fuel tank 100. The air induction hole 12 introduces gas for the portion of the cubic volume of the exhausted fuel and thereby obtaining a constant inner pressure of the fuel tank 100. Thus, it is possible to prevent the inner pressure of the fuel tank 100 from becoming a negative pressure, and to avoid inability to exhaust the fuel by a pump or avoid the fuel from being flown back. Accordingly, the fuel is able to be stably supplied.

The valve 13 is a valve capable of controlling switching drive for opening and closing the air induction hole 12 according to a control signal not illustrated. For example, as illustrated in FIG. 3(A) and FIG. 3(B), the valve 13 is composed of a piezoelectric device 131 to which the control signal is supplied and a supporting section 130 supporting the piezoelectric device 131. The piezoelectric device 131 is composed of, for example, PZL (lead titanate zirconate). Since the piezoelectric device 131 is covered with a barrier membrane (not illustrated), even if liquid enters therein, short circuit is not generated.

Being structured as described above, in the valve 13, when a voltage is supplied to the piezoelectric device 131 by the control signal, for example, as illustrated in FIG. 3(A), the air induction hole 12 is covered and closed, and passing of air and methanol as a fuel is stopped by a high pressure. Meanwhile, when a voltage is not supplied to the piezoelectric device 131 by the control signal, for example, as illustrated in FIG. 3(B), the air induction hole 12 is opened, and air is introduced into the fuel tank 100.

In addition, on the contrary, it is possible that the air induction hole 12 is opened and air is introduced into the fuel tank 100 when a voltage is supplied to the piezoelectric device 131 by the control signal; while the air induction hole 12 is covered and closed, and passing of air and methanol as a fuel is stopped by a high pressure when a voltage is not supplied to the piezoelectric device 131 by the control signal. However, it is more preferable that the air induction hole 12 is covered and closed when a voltage is supplied to the piezoelectric device 131 by the control signal, since thereby electric power consumption is decreased, and constantly closed state results in safety.

Figure 3:
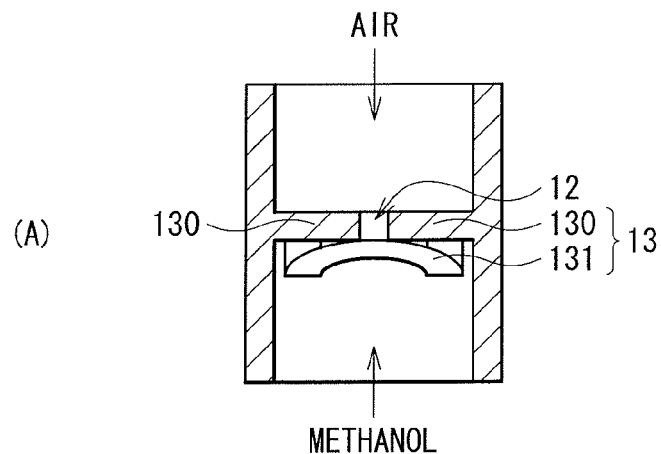
FIG. 3 is a cross sectional view illustrating an example of a detailed structure of the valve illustrated in FIG. 1.
Figure 3:
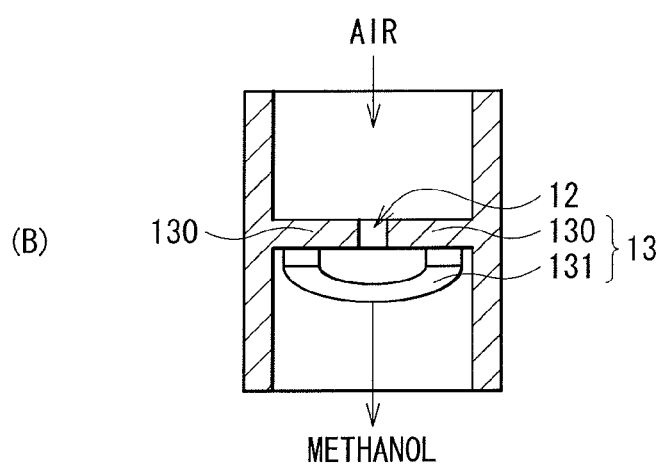
Figure 4:
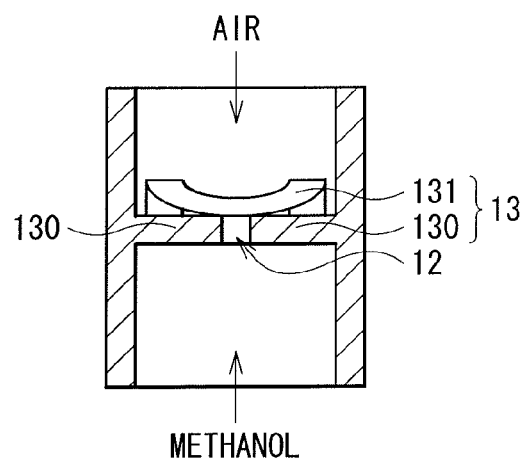
FIG. 4 is a cross sectional view illustrating another example of a detailed structure of the valve illustrated in FIG. 1.

Further, arrangement of the piezoelectric device (valve) is not limited to the arrangement illustrated in FIG. 3, but, for example, the arrangement illustrated in FIG. 4 may be adopted. However, in terms of safety, the arrangement illustrated in FIG. 3 is more preferable than the arrangement illustrated in FIG. 4. If the inner pressure of the fuel cartridge 1 is increased at the time of temperature rise, methanol is leaked if a joint face of the piezoelectric device is separated in the case of the structure illustrated in FIG. 4. Meanwhile, in the case of the structure illustrated in FIG. 3, unless the piezoelectric device is broken, as the inner pressure is increased, the sealing property is further increased.

The fuel cell body 2 includes, for example, the power generation section 20, the fuel supply connector 21 provided on the groove 23 for loading the fuel cartridge 1, and a slit 22.

The power generation section 20 is a direct methanol fuel cell that generates power by reaction of methanol to oxygen. The power generation section 20 has a structure in which one or a plurality of (for example, six) unit cells (not illustrated) having a cathode (oxygen electrode) and an anode (fuel electrode) opposed with an electrolyte film in between are sandwiched between a cathode plate (not illustrated) and an anode plate (not illustrated).

The cathode plate and the anode plate have a function as a fixing member for respectively fixing positions of the cathode and the anode of the power generation section 20. The cathode plate is provided with a through hole (not illustrated) for passing air (oxygen) as an oxidant. A fuel diffusion plate (not illustrated) for diffusing and evaporating the fuel is provided below the anode plate. The supplied methanol is diffused and evaporated in the fuel diffusion plate, passes through the through hole of the anode plate in vaporized state, and is supplied to the anode of the unit cell. Methanol may be supplied in a liquid state.

The cathode and the anode have a structure in which, for example, a catalyst layer containing a catalyst such as platinum (Pt), a platinum (Pt)-ruthenium (Ru) alloy is formed on a current collector made of a carbon paper or the like. The catalyst layer is made of, for example, a substance in which a supporting body such as carbon black that supports a catalyst is dispersed in a polyperfluoroalkyl sulfonic acid system proton conductive material or the like. In addition, an air supply pump not illustrated may be connected to the cathode. Otherwise, it is possible that communication to outside is made through an aperture (not illustrated) provided in a connection member, and air, that is, oxygen is supplied by natural ventilation.

The electrolyte film is made of, for example, a proton conductive material having a sulfonate group (—$SO_3H$). Examples of the proton conductive material include polyperfluoroalkyl sulfonic acid system proton conductive material (for example, "Nafion (registered trademark)," manufactured by Du Pont), a hydrocarbon system proton conductive material such as polyimide sulofnic acid, and a fullerene system proton conductive material.

The fuel supply connector 21 is structured so that an inner valve (not illustrated) is opened when the fuel cartridge 1 is connected to the fuel cell body 2. The fuel supply connector 21 operates with the fuel supply connector 11 on the fuel cartridge 1 side so that the fuel is supplied from the fuel tank 100 to the power generation section 20. In addition, it is possible that the valve function is not provided in the fuel supply connector 21, and only a function to open the fuel supply connector 11 on the cartridge 1 side is provided.

The slit 22 is intended to introduce air into the fuel tank 100 through the air induction hole 12 when the fuel cartridge 1 is connected to the fuel cell body 2 by generating a gap between the fuel cell body 2 and the fuel cartridge 1. In addition, it is possible that instead of the slit 22, a gap formed by connection between respective connectors, a gap formed by a shape of the fuel cartridge 1 or the like is used.

Figure 5:
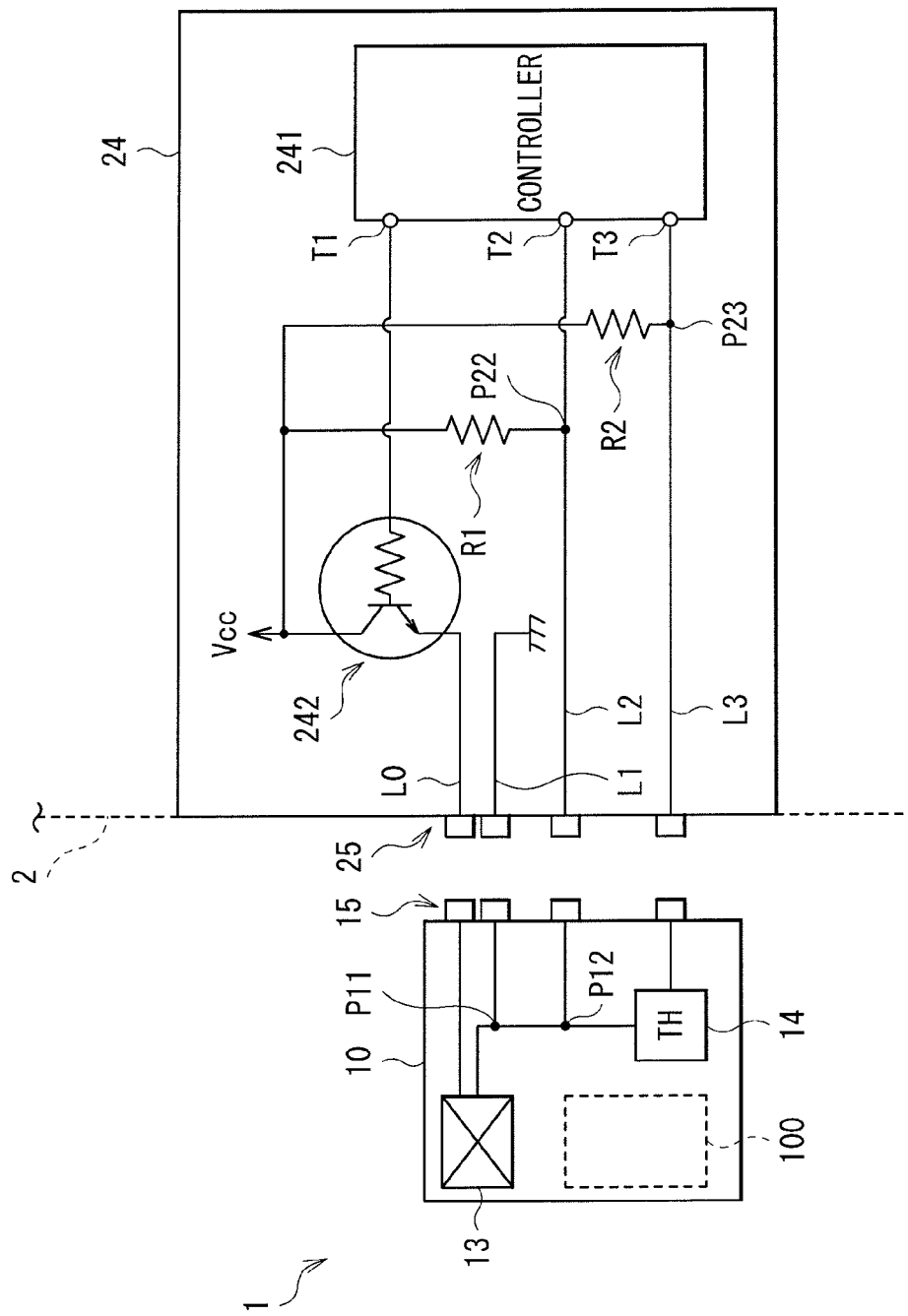
FIG. 5 is a circuit diagram illustrating an example of a control mechanism of the valve in the fuel cell illustrated in FIG. 1.

Next, a description will be given of a control mechanism of the valve 13 in the fuel cell of this embodiment with reference to FIG. 5. FIG. 5 illustrates an example of the control mechanism of the valve 13 with the use of a circuit diagram.

The fuel supply cartridge 1 has a thermistor 14 and a plurality of connection terminals 15 in addition to the foregoing fuel tank 100 and the foregoing valve 13.

The thermistor 14 is arranged between a connection point P12 and the connection terminals 15. The thermistor 14 is a device for detecting temperature of the package 10 or the fuel tank 100 by structuring an after-mentioned temperature detection circuit. Further, in the thermistor 14, a temperature detection signal as a base for generating the control signal of the foregoing valve 13 is generated based on the detected temperature of the package 10 or the fuel tank 100, and is supplied to the connection terminal 15. The connection point P12 is short-circuited to a connection point P11, and the connection point P11 is connected to the valve 13.

The respective connection terminals 15 are connected to a connection terminal 25 of the fuel cell body 2, and thereby electrically connects the fuel cartridge 1 to the fuel cell body 2.

The fuel cell body 2 has a control section 24 for controlling switching drive of the valve 13 in addition to the foregoing power generation section 20 and the like (not illustrated in FIG. 5). Further, the control section 24 has a controller 241 composed of a micro computer or the like, a transistor 242 composed of an NPN transistor, two resistors R1 and R2, and the connection terminal 25.

The controller 241 has three terminals T1 to T3. The controller 241 generates the control signal for controlling switching drive of the valve 13 based on temperature of the package 10 or the fuel tank 100 that is detected by at least the temperature detection circuit (described later) including the thermistor 14. Specifically, in this embodiment, though detailed description will be given later, such a control signal is generated based on the detected temperature of the package 10 or the fuel tank 100 and whether or not the fuel cartridge 1 is normally connected to the fuel cell body 2.

In the transistor 242, a base is connected to a terminal T1 of the controller 241, an emitter is connected to a power source Vcc, and a collector is connected to the connection terminal 25 through a connection line L0. With such a configuration, the transistor 242 becomes on-state or off-state according to the signal outputted from the terminal T1 of the controller 241. Thereby, in the case where the fuel cartridge 1 is connected to the fuel cell body 2, a voltage of the power source Vcc is supplied to the valve 13 through the connection line L0 and the connection terminals 15 and 25.

In the resistor R1, one end is connected to the power source Vcc, and the other end is connected to a connection point P22 on a connection line L2 (connected between the connection terminal 25 and the terminal T2 of the controller 241). Further, in the resistor R2, one end is connected to the power source Vcc, and the other end is connected to a connection point P23 on a connection line L3 (connected between the connection terminal 25 and the terminal T3 of the controller 241). In addition, a connection line L1 is connected between the connection terminal 25 and the ground.

Next, a description will be given of operation and effect of the fuel cell of this embodiment.

In the fuel cell, when the fuel is supplied from the fuel tank 100 through the fuel supply connectors 11 and 21 to the power generation section 20 in a state that the fuel cartridge 1 is connected to the fuel cell body 2, the fuel is supplied to the anodes of the respective unit cells in the power generation section 20, and reaction is initiated to generate protons and electrons. The protons are moved through the electrolyte film to the cathode, are reacted with electrons and oxygen to generate water. Thereby, part of chemical energy of the fuel, that is, methanol is converted to electric energy, which is collected by the connection member, and is extracted as an output current from the power generation section 20. Electro motive force by the output current and the power generation section 20 is supplied to an external load (not illustrated), and the load is driven.

At this time, since the fuel cartridge 1 is provided with the air induction hole 12 through which air for a portion of a cubic volume of exhausted fuel is taken in, gas for the portion of the cubic volume of the exhausted fuel is introduced, and a constant inner pressure of the fuel tank 100 is maintained. Thereby, it is possible to prevent the inner pressure of the fuel tank 100 from becoming a negative pressure, and to avoid inability to exhaust the fuel by a pump or avoid the fuel from being flown back. Accordingly, the fuel is able to be stably supplied.

Figure 6:
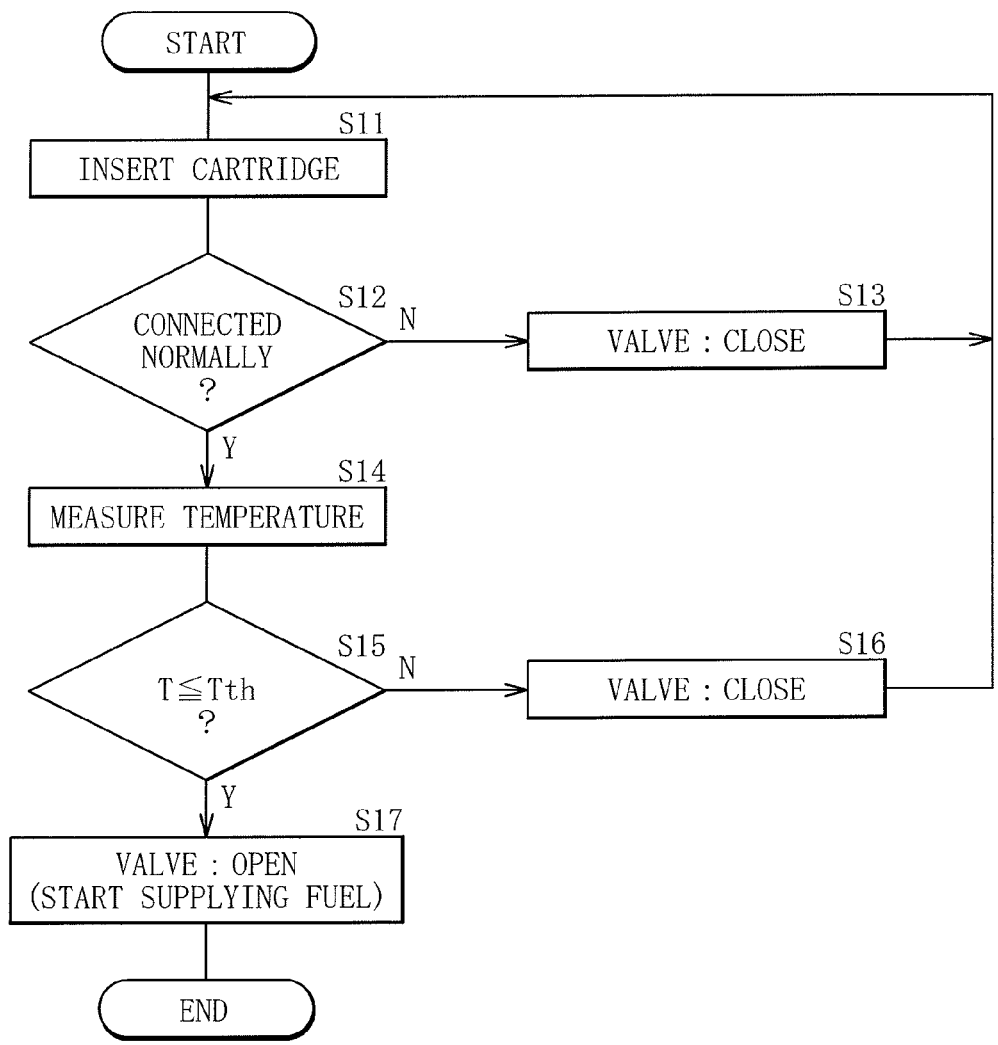
FIG. 6 is a flowchart illustrating an example of a control method of switching drive of the valve.

A description will be given in detail of a control method of switching drive of the valve 13 that is one of the characteristics of the present invention. FIG. 6 illustrates an example of the control method of switching drive of the valve 13 with the use of a flowchart.

Figure 7:
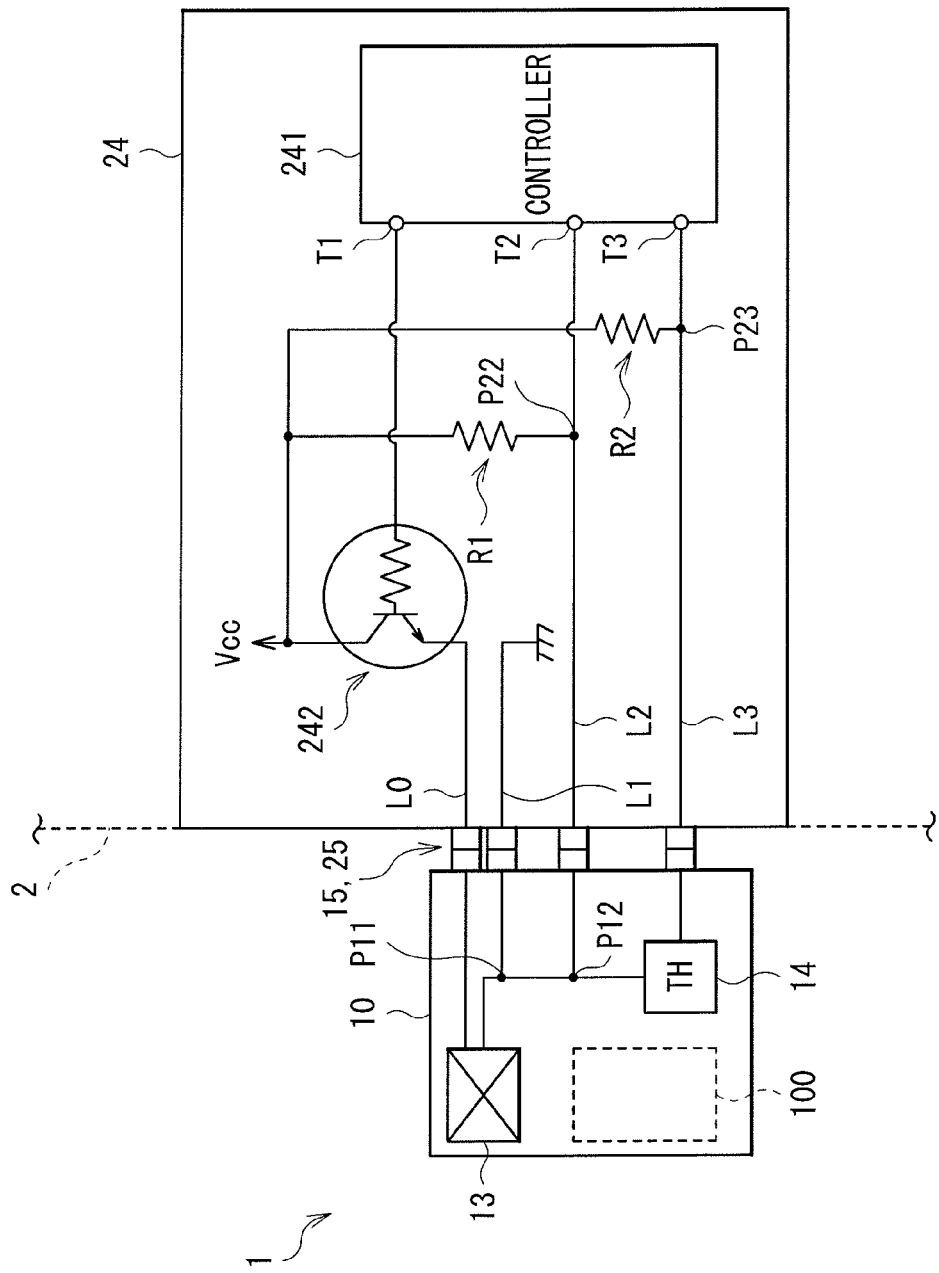
FIG. 7 is a circuit diagram for explaining the example of the control method of switching drive of the valve.

First, for example, as illustrated in FIG. 7, when the fuel cartridge 1 is inserted into the fuel cell body 2, and the connection terminals 15 and 25 are connected to each other (step S11), the fuel cartridge 1 and the fuel cell body 2 are electrically connected to each other.

Next, the controller 241 determines whether or not the fuel cartridge 1 and the fuel cell body 2 are normally connected to each other (step S12). Specifically, in the case where the fuel cartridge 1 and the fuel cell body 2 are normally connected to each other, the connection line L2 is connected to ground through the connection terminals 25 and 15, the connection points P12 and P11, and the connection line L1. Thus determination is made whether or not the connection line L2 is in a state of "L (low)" level by using the terminal T2. Thereby, determination is made whether or not the fuel cartridge 1 and the fuel cell body 2 are normally connected to each other. In the case where determination is made that the fuel cartridge 1 and the fuel cell body 2 are not normally connected to each other in step S12 (step S12: N), a control signal is outputted so that the air induction hole 12 is closed by the valve 13 (step S13), and thereby fuel leakage is avoided. Meanwhile, in the case where determination is made that the fuel cartridge 1 and the fuel cell body 2 are normally connected to each other in step S12 (step S12: Y), the procedure proceeds to step S14. After step S13, the procedure is returned back to step S12.

Figure 8:
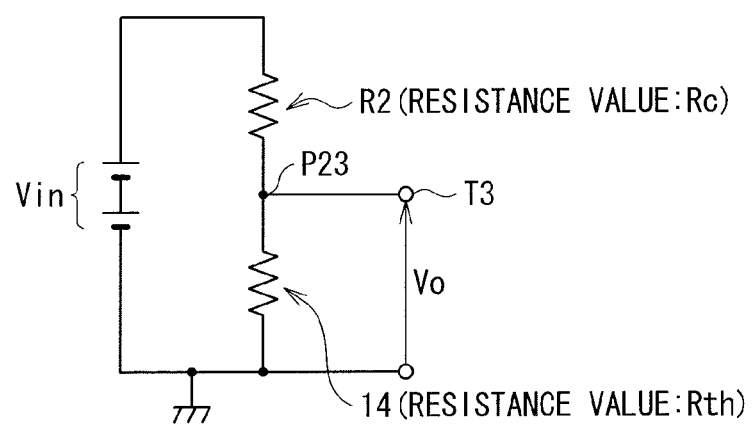
FIG. 8 is a circuit diagram illustrating an example of a temperature detection circuit.

Next, in step S14, for example, as illustrated in FIG. 8, temperature of the package 10 or the fuel tank 100 is detected by using the temperature detection circuit composed of the thermistor 14 and the resistor R2. Specifically, in the thermistor 14, the resistance value (thermistor resistance value $R_{th}$) is changed according to surrounding temperature (temperature coefficient is included). Accordingly, a value of an output voltage $V_0$ shown in, for example, the following Mathematical formula 1 is changed. Thereby, temperature of the package 10 or the fuel tank 100 is indirectly detected.

[Mathematical formula 1]

$$V_o = (R_{th}/(R_{th}+R_c))*V_1 \quad\quad 1$$

$V_o$: output voltage
$V_i$: supply voltage
$R_{th}$: thermistor resistance value
$R_c$: compensation resistance value Next, the controller 241 determines whether or not detected temperature T of the package 10 or the fuel tank 100 is a given threshold temperature $T_{th}$ or less based on a temperature detection signal inputted from the thermistor 14 through the terminal T3 (step S15). In the case where determination is made that the temperature T is not the given threshold temperature $T_{th}$ or less (T>$T_{th}$) in step S15 (step S15: N), a control signal is outputted so that the air induction hole 12 is closed by the valve 13 (step S16), and thereby fuel leakage is avoided. Meanwhile, when determination is made that the temperature T is the given threshold value $T_{th}$ or less (T≤$T_{th}$) in step S15 (step S15:Y), the procedure proceeds to step S17. After step S16, the procedure is returned back to step S12.

Next, in step S17, the control signal is outputted by the controller 241 so that the air induction hole 12 is closed by the valve 13. Thereby, air is introduced into the fuel tank 100 through the air induction hole 12, and control process of switching drive of the valve 13 illustrated in FIG. 6 is finished.

As described above, in this embodiment, control of switching drive for opening and closing the air induction hole 12 is made by the valve 13 capable of controlling switching drive according to the control signal. Thus, introducing air into the fuel tank 100 containing the fuel is able to be controlled. Therefore, for example, at the time of high temperature or fuel disorder, by closing the air induction hole 12 by the valve 13, fuel leakage from the fuel tank through the air induction hole of an existing check valve is able to be prevented, and safety is able to be improved. Further, at the time of power generation, by opening the air induction hole 12 by the valve 13, necessary air is able to be taken into the fuel tank 100, and the fuel is able to be stably supplied.

Further, differently from the existing check valve, the function to open and close the air induction hole 12 by the electric signal (control signal) is included. Thus, by arranging a filter before the air induction hole 12, influence of foreign particle such as dust in the air is able to be decreased, and the function as a valve is able to be improved.

Further, since the control circuit illustrated in FIG. 7 is used, a simple circuit structure in which the number of devices is small is able to be realized. Thus, the fuel cartridge 1 is able to be certified by an inexpensive circuit configuration.

Further, the controller 241 generates the control signal based on two parameters, that is, based on the temperature of the package 10 or the fuel tank 100, and whether or not the fuel cartridge 1 is normally connected to the fuel cell body 2. Thus, compared to a case that the controller 241 generates the control signal based on only one parameter, determination is able to be made more surely.

The present invention has been described with reference to the embodiment. However, the present invention is not limited to the foregoing embodiment, and various modifications may be made. For example, in the foregoing embodiment, the description has been given specifically of the structures of the fuel cartridge 1 and the fuel cell body 2. However, the fuel cartridge 1 and the fuel cell body 2 may have other structure, or may be made of other material.

Figure 9:
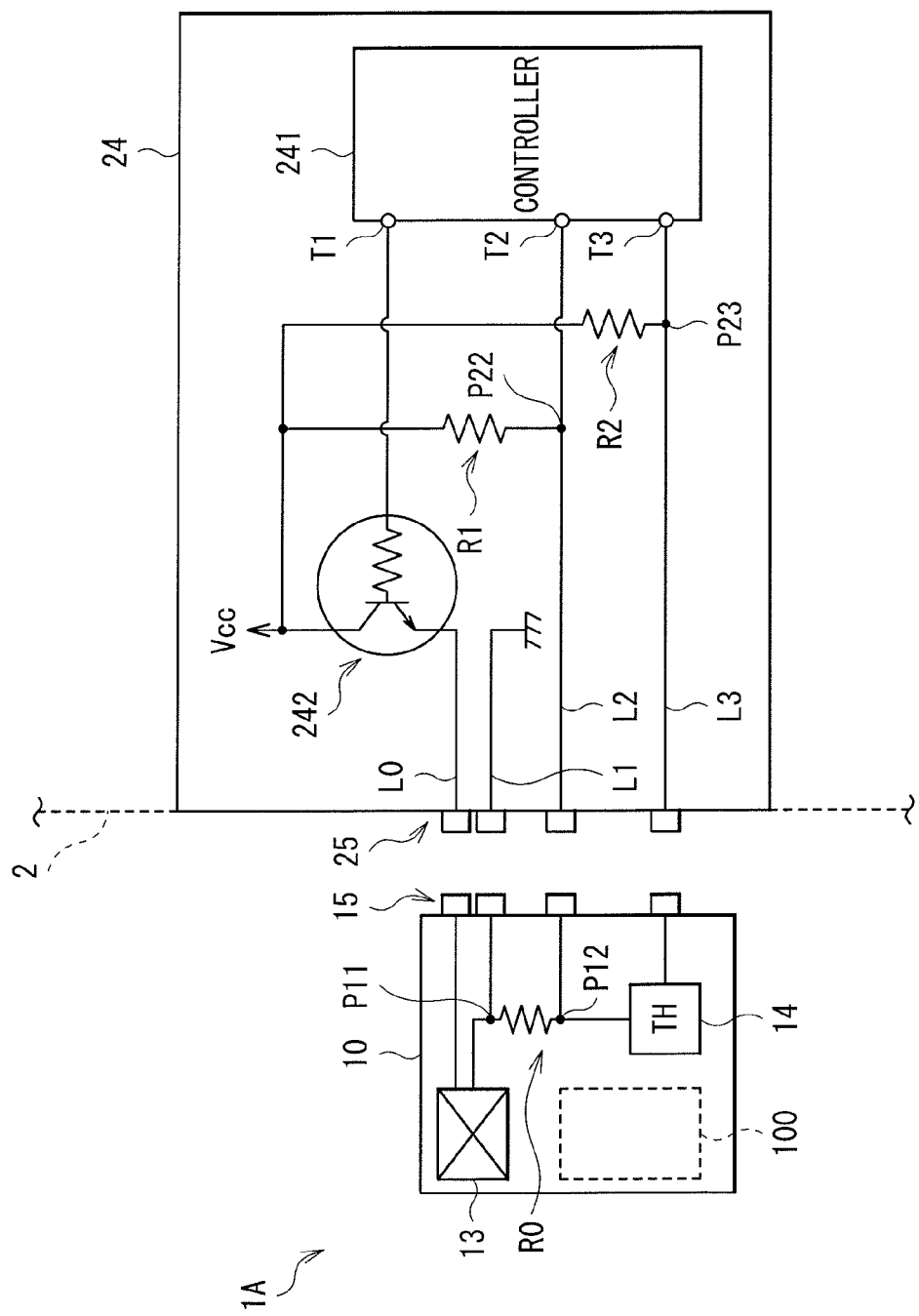
FIG. 9 is a circuit diagram illustrating an example of a control mechanism of a valve using a fuel cartridge according to a first modified example.

Specifically, for example, as a fuel cartridge 1A according to a first modified example illustrated in FIG. 9, a resistor R0 for adjusting the switching threshold for opening and closing the air induction hole 12 in the control signal may be further provided between the connection points P11 and P12. In the case of such a structure, the switching threshold for opening and closing the air induction hole 12 is able to be voluntarily adjusted according to the resistance value of the resistor R0.

Figure 10:
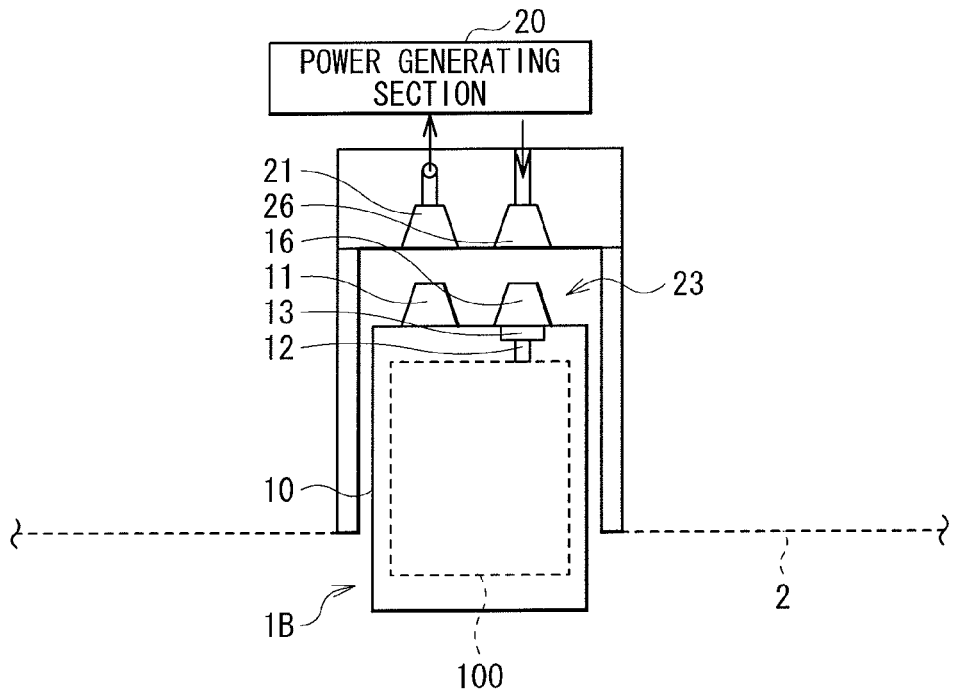
FIG. 10 is a cross sectional view illustrating a substantial part structure of a fuel cartridge according to a second modified example.

Further, for example, as a fuel cartridge 1B according to a second modified example illustrated in FIG. 10, an air induction connector 16 capable of being connected to the fuel supply connectors 11 and 21 concurrently or sequentially may be provided on the outside of the valve 13 (groove section 23 side) in the package 10 (sealing level: connector on the fuel cartridge 1 side>valve 13). As described above, by adopting a structure in which at the time of inserting the fuel cartridge 1, the fuel supply connector 11 and the fuel supply connecter 21 are opened concurrently or sequentially, the sealing level at the time of storage is able to be increased, the safety is able to be improved, and slight fuel leakage before usage is able to be decreased.

Figure 11:
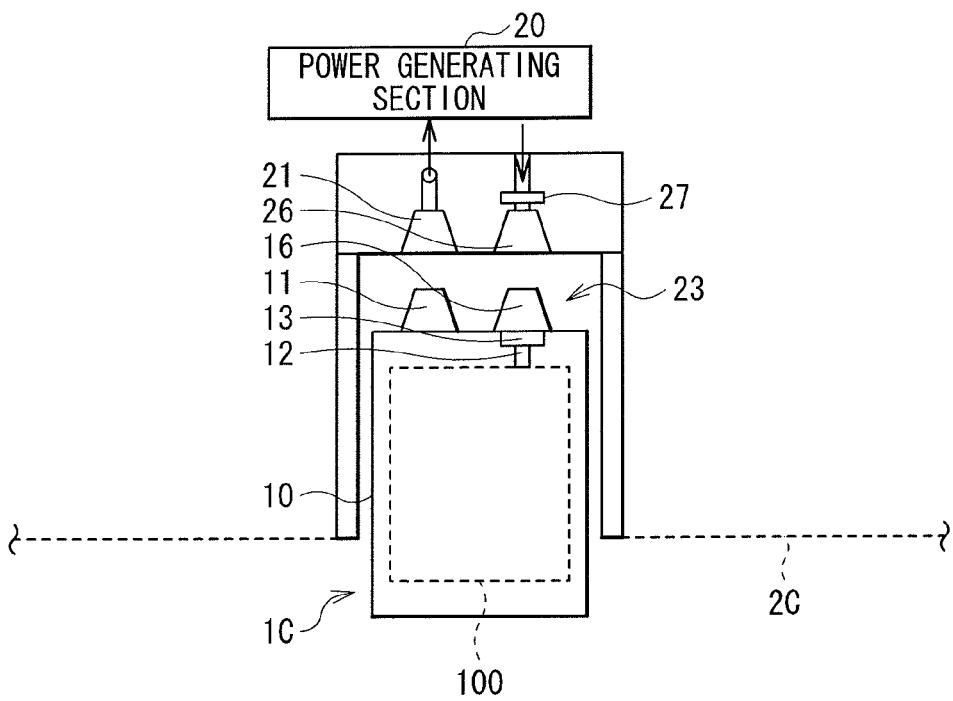
FIG. 11 is a cross sectional view illustrating a substantial part structure of a fuel cell according to a third modified example.

Further, in the foregoing embodiment, the description has been given of the case that the valve (valve 13) is provided on the fuel cartridge 1 side. However, for example, as a fuel cell including a fuel cell body 2C and a fuel cartridge 1C according to a third modified example illustrated in FIG. 11, a valve (valve 27) may be provided on the fuel cell body 2 side.

Figure 12:
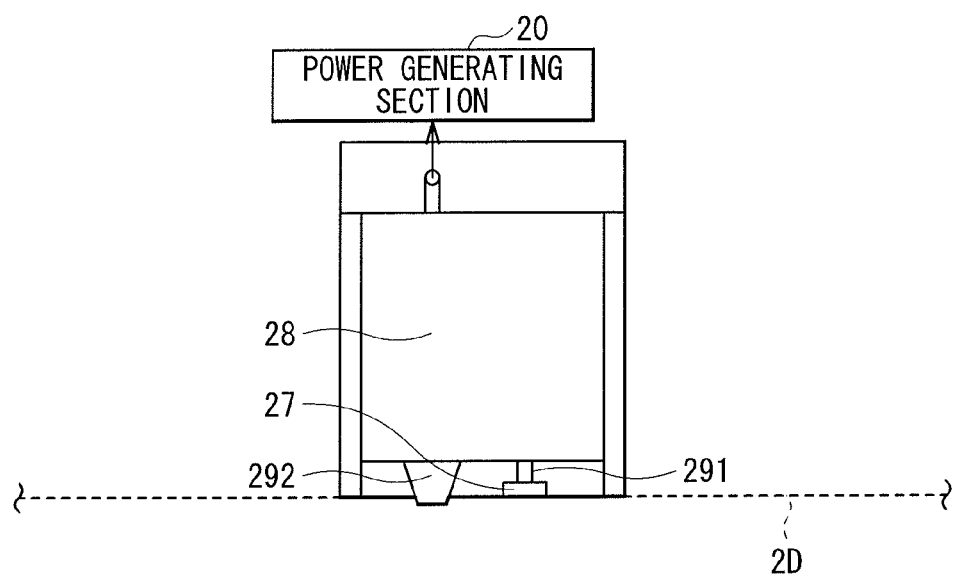
FIG. 12 is a cross sectional view illustrating a substantial part structure of a fuel cell according to a fourth modified example.

Further, in the foregoing embodiment and the foregoing modified examples 1 to 3, the description has been given of the case that the fuel tank (fuel tank 100) is provided in the fuel cartridge. However, for example, as a fuel cell including a fuel cell body 2D according to a fourth modified example illustrated in FIG. 12, it is possible that a fuel tank (fuel tank 28) is built in the fuel cell body 2D, and the valve (valve 27) is provided in the fuel cell body 2D. In FIG. 12, referential symbol 291 represents an air induction hole, and referential symbol 292 represents an immersion connector 292.

Further, in the foregoing embodiment, the description has been given of the case that the temperature of the package 10 or the fuel tank 100 of the fuel cartridge 1 is detected by using the thermistor 14 built in the fuel cartridge 1. However, for example, the temperature of the package 10 or the fuel tank 100 may be detected by using a temperature sensor or the like provided on the fuel cell body 2 side.

Further, for example, the liquid fuel may be other liquid fuel such as ethanol and dimethyl ether other than methanol.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cartridge comprising:
   a package and air within the package, the package having an air induction hole configured to induce air into a fuel tank within the package and containing a fuel for a fuel cell body, wherein the air induction hole comprises a valve within a wall of the package on the exterior surface of the fuel tank and configured to connect to an opening within the fuel cell body and wherein the valve opens and closes the air induction hole; and
   a valve performing switching drive configured to open and close the air induction hole, wherein the valve performing switching drive includes a piezoelectric device to which a control signal is applied to control the switching drive.

2. The fuel cartridge according to claim 1 comprising:
   a temperature detection section detecting temperature of the package,
   wherein the temperature detection section generates a temperature detection signal as a base for generating the control signal based on the detected temperature of the package.

3. The fuel cartridge according to claim 2, wherein the temperature detection section includes a thermistor.

4. The fuel cartridge according to claim 2 comprising:
   a resistor for adjusting a switching threshold for opening and closing the air induction hole in the control signal.

5. The fuel cartridge according to claim 1, wherein the package has an air induction-use connection section on outside of the valve.

6. The fuel cartridge according to claim 1, wherein the fuel cell body includes a slit configured to induce the air into the fuel cell body.

7. The fuel cartridge according to claim 1, wherein the valve is between the wall of the package and the air induction hole.

8. The fuel cartridge according to claim 1, wherein the valve is connected to the wall of the package and the air induction hole, and wherein the air induction hole is connected to the fuel tank.

9. The fuel cartridge according to claim 8, wherein the valve is not in contact with the fuel tank.

10. The fuel cartridge according to claim 6, wherein the package is configured to insert into a fuel cell body and the valve is aligned with the slit.

* * * * *